Figure 1:
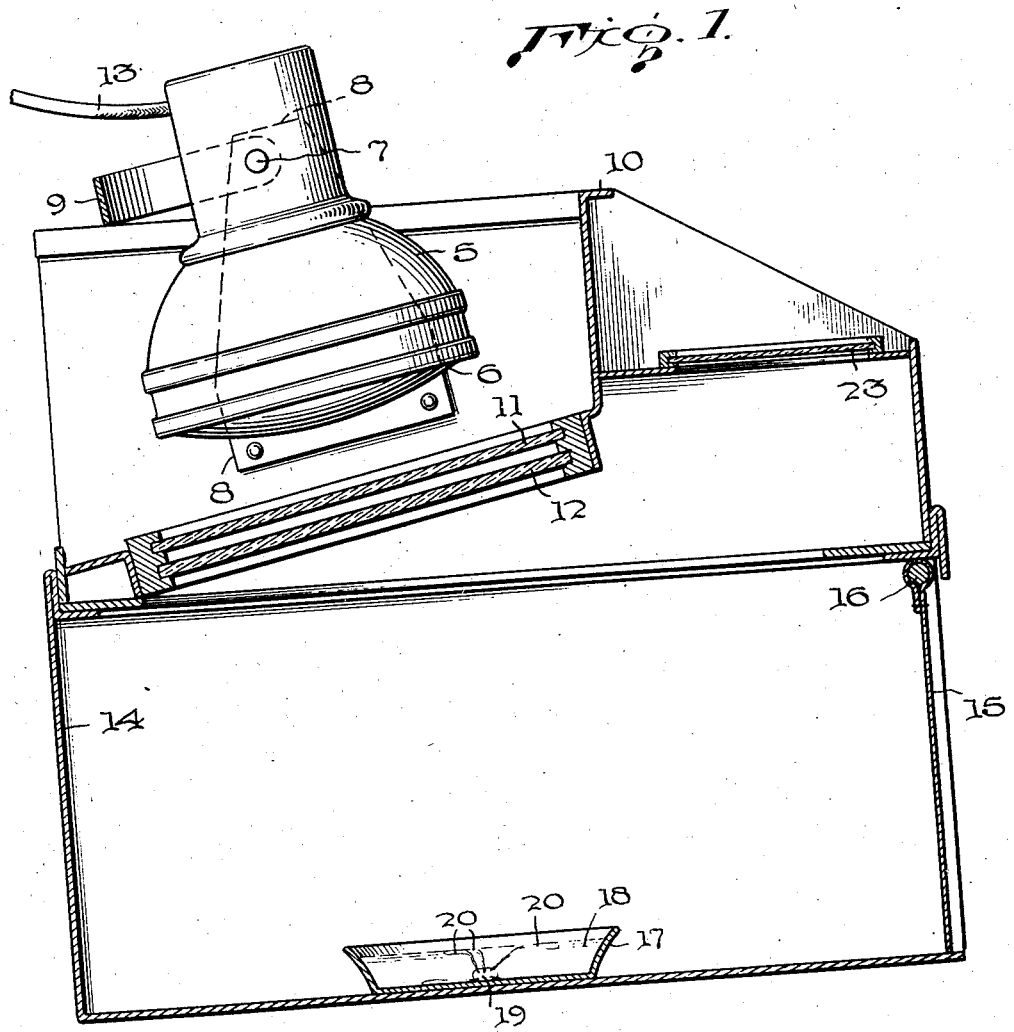

Feb. 10, 1948.                    W. P. RAND                    2,435,843
                METHOD OF EXAMINING EARTH SUBSTANCES BY
                    MEANS OF ULTRAVIOLET ILLUMINATION
                           Filed March 18, 1947

Inventor
WENDELL P. RAND
By A. M. Houghton
his Attorney

Patented Feb. 10, 1948

2,435,843

UNITED STATES PATENT OFFICE 2,435,843

METHOD OF EXAMINING EARTH SUBSTANCES BY MEANS OF ULTRAVIOLET ILLUMINATION

Wendell P. Rand, Pittsburgh, Pa., assignor to Gulf Research & Development Company, Pittsburgh, Pa., a corporation of Delaware Application March 18, 1947, Serial No. 735,428

7 Claims. (Cl. 250—71)

This invention concerns an improved method of examining the fluorescence of earth samples under ultraviolet light, and is more particularly concerned with the analysis of well cuttings employing the phenomenon of fluorescence under ultraviolet illumination for the purpose of determining the presence of petroleum therein.

It is well known that under the influence of ultraviolet light, many minerals fluoresce with a characteristic color permitting their identification. In particular, petroleum is known to fluoresce under ultraviolet illumination and use has been made of this property to determine the presence of minute quantities of petroleum in rock fragments, particularly cores and cuttings removed from a well. Various techniques have been used in examining the fluorescence of cuttings but all of these techniques have certain limitations and disadvantages. My present invention concerns an improved method for analysis of fluorescence.

It is known that the drilling fluid carrying the drilling mud also carries cuttings and small globules of petroleum which may have been liberated in cutting through a petroleum-bearing formation. In the prior art it has been proposed to examine the drilling fluid which leaves the hole by passing the mud stream or a portion thereof under ultraviolet light and observing the fluorescence of the petroleum particles. If sufficient concentration of petroleum is present, the fluorescence of the petroleum is readily observable with the naked eye. For minute quantities it is convenient to observe the surface of the fluid through a microscope, whereby the minute petroleum particles become evident as tiny fluorescent specks or bright "stars" in an otherwise dark field of view. This method while capable of detecting small, and even uncommercially small, quantities of petroleum has the disadvantage of affording no information on the nature of the petroleum bearing rock. Thus the permeability, porosity, and other practically important properties of the reservoir rock do not become evident from this type of analysis.

Another technique which has been proposed is to remove cutting samples from the flowing mud fluid, dry these samples and observe the dry samples under ultraviolet light. At the same time one may compare the appearance of the samples under ultraviolet light with their appearance under ordinary light in order to better distinguish the fluorescent portions of the sample. This method of examination, however, is not always reliable in disclosing the presence of oil, especially if the latter is of a volatile nature and apt to be lost through evaporation from the surface of the rock samples through the drying process.

A further method of examination of well cuttings which has been used in the prior art comprises leaching the cuttings with a measured quantity of non-fluorescent solvent for petroleum. Given sufficient time and agitation the solvent will dissolve from the cuttings all of the petroleum present. The presence of petroleum in the solvent renders the solution fluorescent and the concentration of petroleum in the solvent may be determined from the brightness of fluorescence obtained. This is ordinarily done by comparing the fluorescence of the extract of unknown concentration with the fluorescence of known mixtures of solvent and petroleum. This technique while more quantitative than the preceding ones obviously does not give any information on the permeability or porosity of the petroleum reservoir rock, and its results may further be in considerable error because petroleum from various sources exhibits fluorescence of different colors which are not easily comparable with samples on hand. Further, in a tight reservoir rock the rate of extraction may be very slow.

The present invention is based on the observation that when a non-fluorescent solvent comes into contact with petroleum or other bitumen, the solvent itself becomes fluorescent in those portions of its body in which solution of these materials has occurred. Evaporation from the surface of the volatile solvent exposed in an uncovered, shallow vessel induces convectional movements of the fluid in diverse directions within itself. If small fragments of petroleum- or other bitumen-bearing rock or other material are dropped beneath the exposed surface of an otherwise undisturbed shallow body of a petroleum solvent, such as for example chloroform or ethyl ether, it can be observed under ultraviolet illumination that as the petroleum or bitumen dissolves in the solvent the latter becomes fluorescent in the region immediately surrounding the aforesaid fragment. The convection currents which are set up in the solvent fluid as a result of evaporation from its surface move the petroleum- or bitumen-bearing portions of solvent in such manner as to produce the visual effect of "plumes" or streamers emanating from the petroleum- or bitumen-bearing material. If the particle of petroleum or bitumen is very small, the activity occurs on a correspondingly smaller scale but is still readily visible under ultraviolet light. The effect described may also be seen through a binocular microscope, the use of which serves to enhance observation of the size, color, number and activity of the plumes.

The effect made use of in my invention may be observed even though the chip of well cutting or other material itself shows no surface signs of being petroleum-bearing or bitumen-bearing. Petroleum or bitumen which is held hidden in internal crevices or interstices, or which is held in such interstices as a thin film, readily becomes observable by the practice of my invention.

It is accordingly an object of my invention to provide an improved method of analyzing earth materials or rock cuttings employing the phenomenon of fluorescence under ultraviolet illumination and indicating the presence of petroleum or any bitumen.

Another object of my invention is to provide a method of analyzing earth materials employing the phenomenon of fluorescence under ultraviolet illumination and indicating the presence of petroleum or any bitumen and at the same time giving information about the nature of the petroleum reservoir.

Another object of my invention is to provide an improved method of analyzing well cuttings which gives more reliable and more complete information on the nature of petroleum and its reservoir rock than the heretofore known methods.

A further object of my invention is to provide a method of analyzing earth materials or rock cuttings employing the phenomenon of fluorescence under ultraviolet illumination and the phenomenon of dispersion of a solute in the solvent by convection current.

A still further object of my invention is to provide a method of analysis of fluorescence of earth materials or rock samples in which the phenomenon of dispersion of the solute in the solvent by convection currents is employed to make evident the manner in which the petroleum is held in its reservoir rock.

Figure 2:
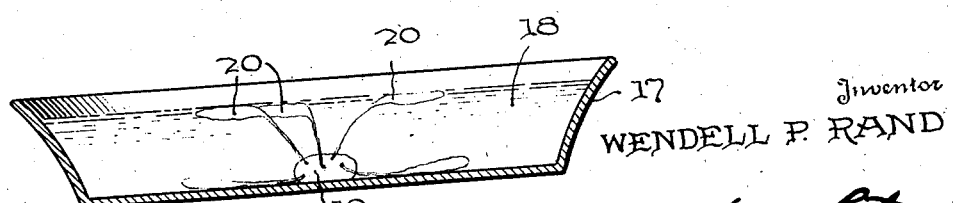

These and other objects are attained by my invention as herein specified and a further description of my invention may be had by reference to the accompanying drawing forming a part of this specification and in which Fig. 1 shows a side elevation of the arrangement of ultraviolet source and sample container which may conveniently be employed in practicing my invention; and Fig. 2 is a sketch showing an enlarged view showing the general nature of the plumes or streamers observed in the practice of my invention.

Referring to Fig. 1, numeral 5 represents the housing of a lamp which is a source of ultraviolet light of the near visible region. The lamp has a conventional power supply (not shown) which supplies power through cable 13 in conventional manner. Many commercial lamps of this type are available. A quartz mercury vapor lamp is an example of a well known source of such light. The front of the lamp housing 5 may comprise a lens or glass plate 6 which is a filter having transmission in the near ultraviolet but which is opaque to short wave radiation beyond the ultraviolet and which is opaque or nearly so to visible light. The filter 6 may conveniently be of a glass such as "Heat Resisting Red Purple Ultra" No. 5874 made by Corning Glass Company. The lamp housing 5 may be mounted on trunnions 7 carried on bracket 8 attached to the top 10 of an instrument case, the lamp handle 9 affording a convenient means of adjusting the angle of the lamp. The instrument case may be provided with an additional filter glass 11 which may be "Heat Resisting Clear Corex D" No. 9700 made by Corning Glass Company. This glass has high transparency for all wave lengths in excess of about 2800 A. U. This window may be arranged in the instrument case so that it is set into a partition of the apparatus to prevent inflammable solvent vapors below it from coming into contact with the hot lamp. A further glass 12 which may be "Red Ultra" 5840 also made by Corning Glass Company may also be added to the filter system to prevent entry of daylight into the observation chamber and also to minimize the slight diffused illumination produced by the small amount of visible violet light which passes through the preceding filter members. The over-all effect of using the filters here mentioned together with a quartz mercury vapor lamp is to obtain radiation lying principally in the band from 3650 A. U. to 3663 A. U. While my invention is not limited to the use of this band, I have found that advantageous results are obtained thereby.

The lower portion 14 of the instrument case may comprise an open topped box or tray on which the top portion 10 rests, the front of the tray having an opening closed by an opaque curtain 15 hung from rod 16. The opaque curtain 15 protects the lower compartment from stray outside light and at the same time restricts the escape of solvent vapors. A window 23 permits observation of material in compartment 14, the window 23 being made of a filter glass which transmits light of visible wave lengths while restraining passage of ultraviolet light.

Window 23 comprises a removable sheet of polished glass which may be "Novial Shade A" No. 3389 made by Corning Glass Company. This glass transmits no radiation of wave length shorter than 4100 A. U. and transmits only a small portion of the short wave length visible violet. It has relatively high transmission for longer wave length visible violet and long visible wave lengths. This filter permits observation of the visible fluorescence, but prevents reflected ultraviolet or visible violet light from reaching the operator's eyes, thereby protecting him from discomfort attending exposure to ultraviolet light. This filter has no practical effect on the character of the observed fluorescence. The compartment 14 may be ventilated by means of a small fan (not shown) if desired.

In the compartment 14 is placed a shallow dish 17 made of a non-fluorescent material. The dish need be only an inch or two in diameter and ⅜ to ½ inch deep but these are not limiting dimensions. In the dish 17 is placed a non-fluorescent solvent of petroleum, to a depth sufficient to cover the rock sample or fragment of material on hand. For this purpose any one of a number of non-fluorescent solvents of petroleum may be used, such as for example chloroform, ethyl ether, petroleum ether, normal pentane, methyl alcohol, acetone, carbon tetrachloride, benzene, carbon disulfide and others. Approximately ¼ inch of solvent is poured into the shallow dish 17 and the dish placed in a position to be illuminated by ultraviolet light from the lamp 5 falling thereon at a slight angle to the vertical. The solvent 18 in the dish 17 should be given a minute or two of time to come to rest so that the solvent is free of violent disturbances or eddies.

With the lamp 5 turned on one or more of the cuttings or fragments 19 to be tested are then carefully dropped into the solvent in dish 17. If the cuttings or fragments 19 contain petroleum or any bitumen, one will observe plumes or streamers 20 having the appearance of smoke wreaths emanating from the petroleum or bitumen particles and from the interstices containing them.

When the fragment of rock or other material comes in contact with the solvent, that portion of the solvent immediately adjacent to a petroleum or bitumen bearing portion of the fragment takes the petroleum or bitumen into solution. The plumes or streamers result from convectional movements of the solvent which causes attenuation of those portions of the petroleum or bitumen bearing solvent immediately adjacent to the fragment.

Fig. 2 is an enlarged picture of the effect observed. The plumes or streamers are observed to form outward in the liquid from the oil particles or oil-containing interstices in the rock cutting 19. If a particle is minutely porous and has low permeability, the plumes will be smaller and their formation will take place at a slower rate and will continue for a longer time than if the permeability is high and ready contact is permitted between all of the oil-wet surfaces and the solvent. The visible effect is entirely lost if the dish is disturbed.

Ordinarily the plumes are clearly enough visible to be observable even though the dish or the solvent produces a slight background fluorescence. If a dish 17 is used which is totally non-fluorescent so that there will be no background fluorescence, the slightest trace of petroleum or bitumen solution can be detected. Such a totally non-fluorescent dish is not necessary for routine analysis and is mentioned only for cases where it is necessary to prove the total absence of petroleum. Platinized dishes are satisfactory for this type of investigation. Glass, plastic or base metal should not be used in this case because glass, plastic, and the oxidized surfaces of most base metals fluoresce slightly and can cause false indications by reflection.

Slight differences in the color of the plumes, the number of plumes and the size of the plumes may be used as a guide to relative saturation. Differences in intensity or vigor of formation of the plumes give an index for estimating the porosity and permeability of the rock sample. An estimate of permeability may also be made microscopically from the ratio of grain size to petroleum bearing capillaries as indicated by plumes formation.

If cuttings or fragments are allowed to remain for some time in the solvent, their oil content will be taken up entirely by the solvent and the continued dispersion of the oil into the solvent will impart an over-all fluorescence to the solution. Such over-all fluorescence is an entirely unreliable economic measure of oil saturation. Over-all fluorescence depends in the first place on the number of saturated particles in the sample, on the character of the reservoir rock, the fluorescent color of the oil and the relative quantities of the sample and solvent. In the second place, bituminous non-reservoir rocks, shales in particular, contain organic substances that are both soluble and fluorescent. Their rate of reaction is slow. A hazy cloud rather than a plume is apparent but the over-all effect produced on standing may rival that of a well saturated reservoir sample. My invention does not contemplate the continued immersion of the rock samples, but instead resides in prompt examination of the reaction which occurs immediately on placing the rock fragment in the solvent.

The reliability of the examination is seriously affected by the treatment the sample receives after its recovery from a well or other source. Rock samples for fluorescent analysis should be washed with water in the same manner as those intended for examination with a microscope. They may be tested while still damp but with increased efficiency when dry. Drying, if done, must be conducted slowly at low heat, preferably by conducting the later stage of drying at room temperature. Samples dried at temperatures uncomfortable to the hand are usually impaired. Those that are even slightly scorched are practically valueless. The reason is not clear, but is possibly the result of a partial oxidation of the exceedingly thin films of oil exposed.

Bitumens, including petroleum and some of the substances manufactured from it, are wholly or partly soluble in various organic solvents. No one solvent serves all purposes. Selection of the best solvent for the problem at hand depends primarily on its effective solubility. For routine analysis of rock cuttings and core chips or fragments of other materials one of the more polar solvents such as chloroform or ethyl ether has been found most satisfactory.

Commercial grades of solvents are the cheapest but usually contain slight amounts of fluorescent impurities. This fluorescence is ordinarily insufficient to cause confusion in the examination of samples containing economically important amounts of oil. Examination of samples containing only trace amounts of oil may require use of the non-fluorescent C. P. grade of the particular solvent.

My invention permits the geologist to observe minutely the nature of the petroleum- or bitumen-bearing particles or interstices in a well cutting or fragment of other material and thereby form an intelligent estimate of the permeability, porosity and degree of saturation of such a sample by a very simple and rapid means. Furthermore it has been found that the effect here described may be obtained with either new or old samples and while the vigor of the reaction may be somewhat reduced for samples which have been exposed to air for a considerable time, the reacting ability of a sample appears to be retained for several years. Contamination of the sample is suspected when an abrupt change occurs in the color of the fluorescent streamers or in the case of an unduly vigorous reaction from scattered fragments in a sample. The contamination is easily recognized because the operator may observe the individual streamer reactions.

Classification of samples may be made on the basis of qualitative estimations as to the vigor of the reaction and color of the fluorescence, and certain conclusions may be drawn from results obtained with different solvents having selective solubility to various petroleum products such as oils, waxes, paraffins and asphalts. It has been found that the estimations made from well cuttings by the technique of this invention are a valuable aid to the geologist in estimating the possible productive horizons encountered in the drilling of a well. The number, color and vigor of the streamers observed from samples taken at various depths as the well is drilled may be recorded or tabulated in the form of a well log and this becomes a useful adjunct to logs of other types. From observation on the source of the streamers and their size a geologist may evaluate practical factors such as permeability and porosity of the reservoir in which the petroleum occurs.

What I claim as my invention is:

1. A method of examining fragments of rock or other materials which comprises removing external impurities from said fragment, gently immersing said fragment in a quiescent non-fluorescent solvent of petroleum under the illumination of ultraviolet light and immediately observing the ensuing reaction.

2. A method of examining fragments of rock or other materials which comprises removing external impurities from said fragment, gently immersing said fragment in a non-fluorescent solvent of bitumen while illuminating both solvent and fragment with ultraviolet light of such wave length as will induce fluorescence in that portion of the solvent which contains bitumen dissolved from said fragment by said immersion.

3. A method of examining fragments of rock or other materials which comprises removing external impurities from said fragment, gently immersing said fragment in a non-fluorescent solvent of petroleum while illuminating both solvent and fragment with ultraviolet light of such wave length as will induce fluorescence in that portion of the solvent which contains petroleum dissolved from said fragment by said immersion.

4. A method of observing fluorescence of well cuttings comprising drying the cuttings removed from a well, placing fragments of said cuttings into a shallow undisturbed dish of non-fluorescent petroleum solvent, illuminating the dish and cutting fragment with ultraviolet light and observing the nature of changes occurring as said fragment is reacted upon by said solvent.

5. A method of examining a sample of rock or other material for presence of a bitumen which comprises removing external water from the sample, gently immersing said sample in a non-fluorescent solvent of the bitumen, immediately illuminating the immersed sample with ultraviolet light of a wave length to induce fluorescence of dissolved bitumen and observing said fluorescence.

6. A method of well logging which comprises removing a rock sample from a known depth in the well, removing external impurities from said sample, gently immersing said sample in a non-fluorescent solvent of petroleum and immediately illuminating the imersed sample with ultraviolet light of such wave length to induce fluorescence of petroleum removed from said sample by said immersion, and correlating a characteristic of the phenomena observed with depth from which the sample was obtained.

7. A method of examining rock fragments which comprises removing external impurities from said fragment, gently immersing said fragment in a non-fluorescent solvent of petroleum while illuminating the immersed fragment with ultraviolet light of wave length between 3650 and 3663 A. U. to induce fluorescence of petroleum removed from said sample by said immersion.

WENDELL P. RAND.

REFERENCES CITED

The following references are of record in the file of this patent:

UNITED STATES PATENTS

| Number | Name | Date |
|---|---|---|
| 2,337,465 | Heigl | Dec. 21, 1943 |
| 2,356,454 | Ferguson | Aug. 22, 1944 |
| 2,359,135 | Lynton | Sept. 26, 1944 |